US012496464B2

(12) United States Patent
Peri et al.

(10) Patent No.: US 12,496,464 B2
(45) Date of Patent: Dec. 16, 2025

(54) SYSTEM AND METHOD FOR GENERATION AND USE OF RADIATION OUTCOME PREDICTION SCORE IN PATIENTS UNDERGOING RADIOTHERAPY

(71) Applicant: COGNITIVECARE INDIA LABS LLP, Visakhapatnam (IN)

(72) Inventors: Venkat Narasimham Peri, Visakhapatnam (IN); Venkata Satya Suresh Attili, Visakhapatnam (IN); Santosh Yogendra Shah, Visakhapatnam (IN); Venkatesh Srinivas Sista, Visakhapatnam (IN); Naresh Nelaturi, Visakhapatnam (IN); Manoj Ramesh Teltumbade, Visakhapatnam (IN); Satya Pavitra Rani, Visakhapatnam (IN)

(73) Assignee: COGNITIVECARE INC.

( * ) Notice: Subject to any disclaimer, the term of this patent is extended or adjusted under 35 U.S.C. 154(b) by 331 days.

(21) Appl. No.: 17/794,828

(22) PCT Filed: Jan. 28, 2020

(86) PCT No.: PCT/IN2020/050090
§ 371 (c)(1),
(2) Date: Jul. 22, 2022

(87) PCT Pub. No.: WO2021/100053
PCT Pub. Date: May 27, 2021

(65) Prior Publication Data
US 2023/0001234 A1 Jan. 5, 2023

(30) Foreign Application Priority Data
Nov. 22, 2019 (IN) .............................. 201941047665

(51) Int. Cl.
*A61N 5/10* (2006.01)
*G16H 20/40* (2018.01)

(52) U.S. Cl.
CPC .......... *A61N 5/1031* (2013.01); *G16H 20/40* (2018.01); *A61N 2005/1032* (2013.01)

(58) Field of Classification Search
CPC .......... A61N 5/1031; A61N 2005/1032; A61N 5/103; G16H 20/40; G16H 50/30
(Continued)

(56) References Cited

U.S. PATENT DOCUMENTS

| 2012/0004492 A1* | 1/2012 | Weibrecht | G16H 70/60 |
| | | | 382/128 |
| 2015/0095044 A1* | 4/2015 | Hartman | A61N 5/103 |
| | | | 705/2 |

(Continued)

OTHER PUBLICATIONS

International Search Report and Written Opinion for PCT/IN2020/050090, Mailing date of May 22, 2020.

*Primary Examiner* — Kambiz Abdi
(74) *Attorney, Agent, or Firm* — Raj S. Dave; Dave Law Group LLC

(57) ABSTRACT

A system and method for generation and use of radiation outcome prediction (response & side effects) score for patients undergoing radiotherapy for various medical conditions wherein the score is a personalized score, provided by analyzing multiple parameters including the tumor specific, patient specific, gene specific and treatment planning specific parameter(s), during and post therapy.

17 Claims, 4 Drawing Sheets

(58) Field of Classification Search
USPC ............................................................ 705/2
See application file for complete search history.

(56) References Cited

U.S. PATENT DOCUMENTS

| | | |
|---|---|---|
| 2015/0367145 A1 | 12/2015 | Sjölund et al. |
| 2017/0083682 A1* | 3/2017 | McNutt ................ A61N 5/1031 |
| 2018/0165423 A1 | 6/2018 | Kuusela et al. |
| 2020/0197726 A1* | 6/2020 | Cordero Marcos .. A61N 5/1031 |
| 2021/0142910 A1* | 5/2021 | Hafez ....................... G06N 5/01 |

* cited by examiner

SYSTEM AND METHOD FOR GENERATION AND USE OF RADIATION OUTCOME PREDICTION SCORE IN PATIENTS UNDERGOING RADIOTHERAPY

CROSS-REFERENCE TO RELATED APPLICATIONS

This application claims the benefit of Indian Patent Application number 201941047665 filed on Nov. 22, 2019, which is hereby incorporated by reference in its entirety.

TECHNICAL FIELD

The field in general relates to prediction of outcomes (response and adverse events) in patients undergoing radiation therapy for any medical indication. Particularly it relates to determination of outcome of radiation in terms of response and side effects for patients undergoing radiotherapy for various medical conditions and accordingly devising the best radiotherapy treatment strategy and/or personalized medicine to the patient.

BACKGROUND

Radiotherapy uses high energy wavelengths like gamma rays or X rays to produce changes in the cell at various levels, which is often lethal. When it is used to target the tumor cells, it is called therapeutic radiation-often referred to as "radiotherapy" in the cancer practice. The latest advances include use of particles like protons or alfa particles, which is yet to be universally available.

To start with clinicians, radiation oncologists and physicists used the surface anatomy to predict the underlying organs (presumed to be effected by cancer) to plan radiation. This was often done on 2D x-ray images, using hand with manual calculations. With time and availability of advanced Computing the treatment planning systems became faster and more accurate.

In the next decades—where imaging has advanced (CT scans, more powerful computers), the ability to make dose calculation algorithms became better and with mechanical advancements in radiotherapy machines (Multileaf collimators—MLCs) the Level 2 technique were invented VIZ-3D conformal planning (3DCRT) that can shape the radiotherapy beam to closely match the shape of a target tumor, thereby reducing the dose to healthy surrounding tissue.

The next invention is inverse planning to provide further improved dose distributions (i.e. better coverage of target tumors and sparing of healthy tissue)—also called IMRT or VMAT. The process involves—creating a virtual patient from CT scan/PET/MRI using a computer-aided design for defining and planning the volume and anatomy to be treated. In more advanced and rare cases, multimodality image matching, also known as image coregistration or fusion can also be used. Treatment simulations are used to plan the geometric, radiological, and dosimetric aspects of the therapy using radiation transport simulations and optimization. For intensity modulated radiation therapy (IMRT), this process involves selecting the appropriate beam type (which may include photons, electrons and protons), energy (e.g. 6, 18 megaelectronvolt (MeV) photons) and physical arrangements. In brachytherapy planning involves selecting the appropriate catheter positions and source dwell times (in HDR brachytherapy) or seed positions (in LDR brachytherapy).

The optimization process-often referred to as forward planning and inverse planning are used to calculate the ideal beams, fractionations and duration. Plans are often assessed with the aid of dose-volume histograms, allowing the clinician to evaluate the uniformity of the dose to the diseased tissue (tumor) and sparing of healthy structures.

Forward planning, where dose distribution is decided based on the anatomy, beam modifiers (wedges), specialized collimation, field sizes, tumor depth, etc. is based on a prior CT scan of the patient. The models for dose calculation models include pencil beam, convolution-superposition and monte carlo simulation, with precision versus computation time being the relevant trade-off.

In inverse planning, a more complex and precise, once patient's critical organs and tumor are pre-defined. Planner gives target doses and importance factors for each. Then, an optimization program is run to find the treatment plan which best matches all the input criteria.

In contrast to the manual trial-and-error process of forward planning, inverse planning uses the optimiser to solve the inverse problem as set up by the planner.

Radiogenomics—the whole genome application of radiogenetics, which studies the influence of genetic variation on radiation response. Work in the area focuses on uncovering the underlying genetic causes of individual variation in sensitivity to radiation, which is important for effective, safe treatment.

In cancer research, it is immensely important to predict survival time for a patient in order to treat the disease effectively. Survival score is a metric that represents the predicted survival probability. Survival scores serve as prognostic markers and play a crucial role in assigning patients a particular treatment or therapy. Usually, patients are binned into two or three groups such as Good, Poor, and Worse prognosis according to their survival score. Patients with good prognosis have higher survival scores and may survive for longer duration.

Similarly, adverse event scores are available with respect to chemotherapy treatment. Adverse Event (AE) score is a metric that represents the predicted negative impact of the drug therapy on Quality of Life due to its adverse events. Certain population segments, for example, the elderly patients are more prone to chemotherapy toxicity and such therapy can do more harm than benefit the patient. This is of great concern since modern medicine has increased life expectancy and there are more cases of cancer emerging in the elderly especially after 70 years of age.

Hence, in precision medicine, practitioners must strive to predict survival scores and AE scores for an individual patient and determine the chemotherapy that is associated with the highest survival score and lowest AE score for that patient.

Traditionally, patients' covariates such as inflammation markers, tumor properties and few gene expression signatures were used to predict survival score for the patient (Detailed in Table1). For example, modified Glasgow Prognostic Score is calculated using serum elevation of CRP and hypoalbuminemia while CIN70 uses average gene expression of 70 genes related to chromosomal instability.

| Score | Parameters |
| --- | --- |
| CIN70 Score | Gene expression signature for chromosomal instability |
| Genetic Progression Score | Genetic alteration during tumor progression |
| Glasgow Prognostic Score | Inflammation-based marker |
| LMR Score | Lymphocyte-to-monocyte ratio |
| MicroRNA Signature Score | Tumor microRNA expression |
| Multi-omics based Score | RNA expression, microRNA expression, DNA methylation |
| Palliative Prognostic Index | Clinical symptoms |
| PCNA Score | Proliferating cell nuclear antigen protein expression in tumor |
| Quality of Life Score | Survey questionnaire of quality of life |
| SSIGN Score | Tumor stage, size, grade and necrosis |
| Survival Prediction Score | Primary cancer site, site of metastases, and Karnofsky performance score |
| TNM Score | TNM variables (tumor size, number of positive regional lymph nodes, and distant metastasis) |
| UCSF-CAPRA Score | Preoperative prostate specific antigen, Gleason score, Clinical T-stage, Biopsy result and age |

An important score for AE prediction in literature is: The Chemotherapy Risk Assessment Scale for High-Age Patients (CRASH) Score. It uses parameters like lymphocytes, aspartate aminotransferase level, Instrumental Activities of Daily Living score, lactate dehydrogenase level, diastolic blood pressure and chemotoxicity to predict hematological toxicity and parameters like hemoglobin, creatinine clearance, albumin, self-rated health, Eastern Cooperative Oncology Group performance, Mini-Mental Status score, Mini-Nutritional Assessment score and chemotoxicity to predict non hematological toxicity. However, there is no such radiation one that is comprehensive.

The existing gap of the current planning is still far from perfect in predicting the possible responses of the tumor and toxicity to the normal tissues. At the same time there is no system that is currently looking into the holistic tumor environment to plan the optimal dose required.

For example—the tumors of the cervix are treated with same dose and the volumes are based on the standard CTV, PTV and GTV as per the literature, whereas the larger tumors have a significant portion of the central hypoxia, and they are naturally resistant to conventional radiation dose and fractionations. Similarly, those sarcomas with larger vascular density too are tough to treat as there shall be endothelial reaction over time and at the end of therapy—the oxygen delivery capacity of the existing vessels diminish significantly leading to less free radical production and less tumor response. Another example is the role of genetics and few of the mutations confer natural resistance to the tumor—which may require larger doses. In few other mutations—one can actually give much lesser doses to cure the cancer—thereby minimizing the long-term toxicity.

The same rules are applicable for the normal tissue as well—the natural genetic variability, age, hydration, and other factors also decide the long- and short-term toxicity of the person.

There is an immense need to personalize the radiotherapy process in terms of getting a score and optimizing the actual tumor dose vs dose to normal tissue so that more tumor regression with optimal/minimal side effects to normal tissues.

SUMMARY OF THE INVENTION

Accordingly, in order to obviate the drawbacks in the existing state of art radiation therapy, the invention herein discloses a system and method for radiation outcome prediction (response & side effects) score for patients undergoing radiotherapy for various medical conditions.

The system for generating the real-time, dynamic, comprehensive radiation outcome prediction score for patients undergoing radiotherapy (the term radiotherapy also includes/means radiation therapy) for various medical conditions comprising of a processor; one or more rule based algorithms supported by big data analytics and machine learning coupled to the processor, further comprising of an interface module configured to receive raw data from multiple sources; a harmonization module configured to convert and combine the raw data transmitted from the interface module into uniform, unambiguous, standardized usable record structure for further processing; a storage module for storing the standardized data into records; a machine learning module comprising of one or more machine learning models trained by utilizing the stored standardized data and configured for performing the analytics to gaining insights on most appropriate treatment for a patient based on their clinical and medical characteristics; a clinical decision module configured to provide knowledge represented through machine learning module to aid physicians suggesting optimal specification of treatment parameters for a patient; an output layer configured to present the disease recurrence score, time to recurrence score, recovery probability score and/or adverse reaction score for a specific treatment; and a treatment assessment module configured to ratify the radiotherapy dosage parameters. The system for generating the real-time, dynamic, comprehensive radiation outcome prediction score for patients undergoing radiotherapy for various medical conditions provides a personalized score by analyzing multiple parameters including but not limited to tumor specific, patient specific, gene specific and treatment planning specific parameters to provide a personalized score, both during the therapy and post therapy.

The clinical decision module comprises of adjuvant radiotherapy progression free survival model, adjuvant radiotherapy overall survival model, neoadjuvant radiotherapy RECIST criteria-based probability of tumor regression model, neoadjuvant radiotherapy progression free survival model, neoadjuvant radiotherapy symptom improvement model, radical radiotherapy overall survival model, radical radiotherapy RECIST criteria-based probability of tumor regression model, radical radiotherapy progression free survival model, radical radiotherapy symptom improvement model, palliative radiotherapy symptom improvement model, palliative radiotherapy RECIST criteria-based probability of tumor regression model, palliative radiotherapy progression free survival model, palliative radiotherapy overall survival model, radiotherapy areas of recurrence model, radiotherapy side effects grade model, radiotherapy side effects time to resolution and radiotherapy non-resolving side effects model.

The system is capable of learning from the feedback provided in terms of tumor response and toxicity, and upgrade and autocorrect futuristically. The system also recalibrates the scores for tumor response and toxicity, based on some or all of the parameters detailed (tumor regression, oxygen concentration, patient side effects) advising timely medical intervention based on the summary of overall risk level for all aspects of a patient's health (side effects vs tumor response) and accordingly help to update the radiation planning The system takes into account various factors that potentially influence the tumor response to the treatment such as, tumors' cellular composition, organ level structure, and its interaction with surrounding normal tissues. The system is configured to provide more specific predictability of the tumor response to therapy as well as toxicity to the normal tissue. A change in any of parameter/s-individual or in combination with others-affects the remaining and helps to understand this interplay, by using a rule-based system that upgrades itself on feedback mechanism and facilitates to generate a score that the clinician/radiation oncologist shall use to understand the probability of response vs toxicity to normal tissues and help to plan in a better way.

Herein disclosed is also a method for generating real-time, dynamic, comprehensive radiation outcome prediction score for patients undergoing radiotherapy for various medical conditions by analyzing multiple parameters including but not limited to tumor specific, patient specific, gene specific and treatment planning specific parameter(s) to have a personalized score during and post therapy comprising: collection of raw data; pre-processing and standardisation of the collected data; storage of the standardised data; calculating the risk probabilities for survival, adverse events, and treatment response; computing patient-specific risk scores related to survival, adverse events, and treatment response by the clinical decision module; and updating the risk scores by incorporating current treatment information and disease response to the treatment through a feedback system.

The system as depicted in FIG. 1 for generating the real-time comprehensive radiation outcome prediction (response & side effects) score for patients undergoing radiotherapy for various medical conditions utilizing various patient specific (102), gene specific (104), tumor specific (106), treatment planning specific (108) parameters.

The system as described herein provides more specific predictability of the tumor response to therapy as well as toxicity to the normal tissue.

The system as described herein shall take into account interplay of various factors that potentially influence the response of a given tumor by virtue of its cellular/tissue and organ level makeup and interaction of the same with surrounding normal tissues.

The parameters include but not limited to:
Patient related parameters—Age, smoking history, alcohol use, ethnicity, weight, height, breast volume for breast patients (cup size), co-morbidity (for example, diabetes, collagen vascular disease, hypertension, inflammatory bowel disease), genetic makeup, body fat, food habits etc.
Tumor related—Type, stage (tumor, node, metastases (TNM), pathology, volume, vascular density, oxygenation estimated by imaging, hydration status, genetic makeup (ER/PR/P53/HER 2/and other tumor specific markers as described in literature), grade of the tumor, Ki-67 index, and other factors as detailed below
Array of Known and proposed gene variations—irs1 (XRCC2), irs2 (XRCC8), irs3 (RAD51C), irs20 (PRKDC), IRS1-SF (XRCC3), xrs5 (XRCC5) and XR-1 (XRCC4) and more
Anatomical variables—Distance of organ traversed in RT field, Vessel wall thickness, hydration status of tissue, Percent of necrosis, stromal effect, tissues surrounding the tumor, proximity to critical structures
Metabolic variables—Lipid content/Bone density/Muscle mass, hypoxic tissue, estimated pH, hydration status, possibility of pre-existing free-radical insult at cellular level
Physiological variables—Blood flow/Local pH/Oxygenation
Physics—Total radiation dose, dose per fraction, overall treatment time, planned doses to critical normal tissues. Temperature of organ vs room, beam features.
Toxicity related—Pre-treatment data that Use site-specific patient-reported toxicity preferable as primary endpoints as physician-reported toxicity underestimates toxicity. Physician-reported toxicity.

Wherein a change in any of parameter/s—individual or in combination with others-affects the remaining and helps to understand this interplay, by using a rule-based system that upgrades itself on feedback mechanism and facilitates to generate a score that the clinician/radiation oncologist shall use to understand the probability of response vs toxicity to normal tissues and help to plan in a better way.

The system as described herein provides a score that Considers-Anatomical/genetic/Physiological and other factors as described above and gives a score to each normal organ—for the risk it may stand in long and short term. To be specific, the system generates and gives overall cumulative risk score.
For disease recurrence (distribution of dose and other factors that may confer resistance to tumor);
Adverse reaction score—for cumulative side effects on all normal tissues-long and short term;
Recovery probability score—for normal tissues/Organs; and/or
Gives permutations and combinations—to help choose best treatment plan The probabilistic predicting system shall help both patients, care givers and physicians a score that is easy to interpret and will be able to understand as to "what could be the impact of variation of each of the above parameters (ex—if I increase the dose, what shall be toxicity probability at 6 months, or If there is more necrosis, what additional dose shall be achieving higher cure rates, or if a given genetic makeup is present-what dose and planning shall suffice, or if the patient is having fever on a given day, what adjustments that needs to be made to counter the same etc.), in an interactive manner and accordingly generates recommendations to concerned clinician/radiation oncologist for each aspect of the patients health including indication of potential side effects/recurrence rates, response to therapy based on the summary of overall risk score.

The output/reports could be as informative to patients as they are to the physicians. Appropriate context, and literature-based abstract (from the available medical literature) allows it possible to make sense of these scores (not just alpha numerical anymore).

The system as described herein is also capable of learning from the feedback provided in terms of tumor response and toxicity by virtue of machine learning algorithms and upgrade and autocorrect futuristically.

The system, while on treatment also re-calibrates the scores for response and toxicity, based on some or all of the above parameters (tumor regression, oxygen concentration, patient side effects) advising timely medical intervention based on the summary of overall risk level for all aspects of a patient's health (side effects vs tumor response) and accordingly help to update the radiation planning.

The system comprises of rule-based algorithms supported by big data analytics and machine learning (AI), with a user-friendly interface, which converts the complex medical/diagnostic/genetic/physics data to simple score that reports into tumor score vs Adverse event score for personalizing therapy.

A method for generating real-time, dynamic, comprehensive radiation outcome prediction score for patients undergoing radiation therapy for various medical conditions by analyzing multiple parameters including the tumor specific, patient specific, gene specific and treatment planning specific parameter(s) to have a personalized score during and post therapy comprising the steps: collection of raw data; pre-processing and standardisation of the collected data; storage of the standardised data; calculating the risk probabilities for survival, adverse events, and treatment response; computing patient-specific risk scores related to survival, adverse events, and treatment response by the clinical decision module; and updating the risk scores by incorporating current treatment information and disease response to the treatment through a feedback system.

The method summarizes the overall risk level for all aspects of a patient's health including but not limited to probable tumor regression; probable length of time for recurrence; probable areas of recurrence; probable side effects (long term and short term) to normal tissues; probable regression time for side effects; probable residual/non resolving side effects; probable benefits of addition to chemotherapy or other adjuvant modalities; and facilitates in generating detailed interpretative information for each specific patient that is dynamic in nature, throughout the course of treatment and follow up.

The method as described herein comprises the step of receiving radiation score for a specific aspect of patient's health, generating a probabilistic model for cumulative personalized response/side effects.

DETAILED DESCRIPTION OF THE INVENTION

Figure 1:
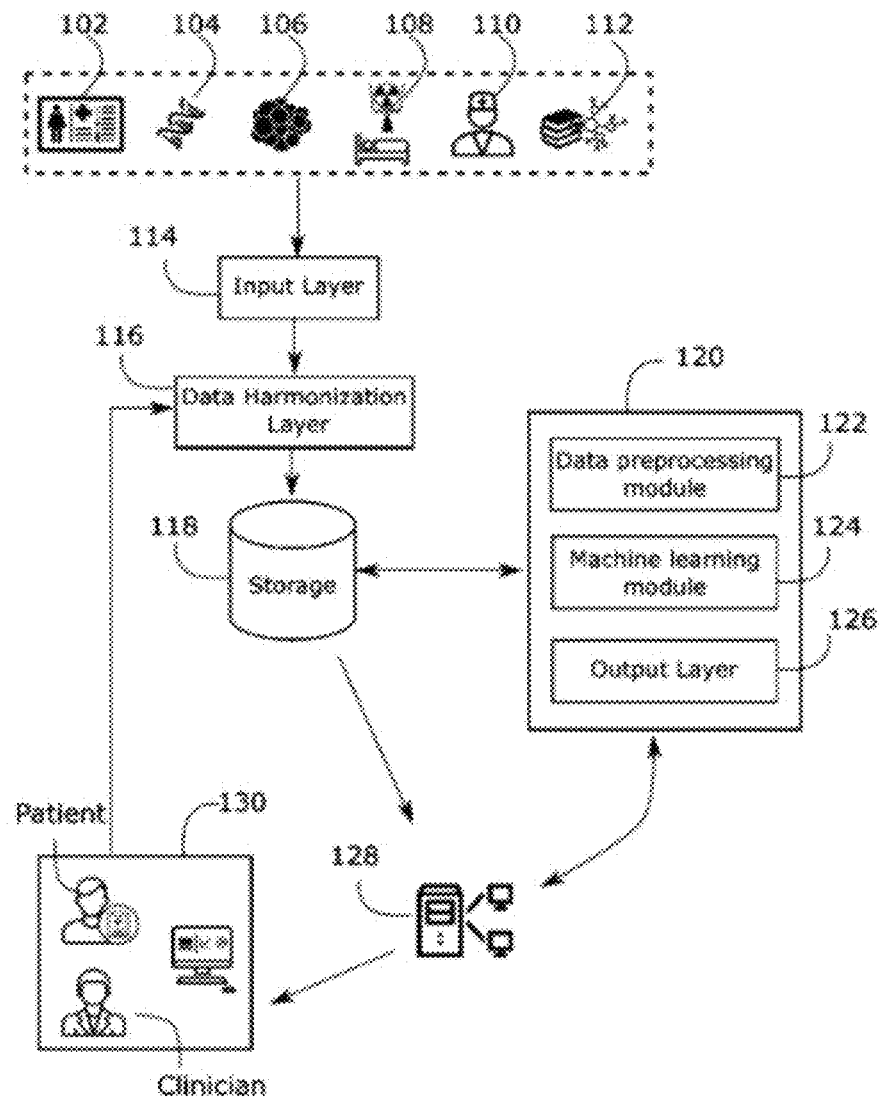
FIG. 1 shows the detailed schematic representation of the device.

The illustrative embodiments of the system include Artificial Intelligence based software system(s) for determining and analyzing radiotherapy treatment using tumor parameters. According to one embodiment, the tumor parameters shall be considered, that are known or postulated to affect the response rates of the cancer treatment using radio therapy. The system provides a method for computing scores that can be used to assess a cancer treatment specification for a given set of patient and tumor characteristics. Subsequently, the system aids physicians in determining optimal dose of radiation required to combat the tumors.

In one embodiment, the system receives data about patient characteristics pertaining to clinical, medical, genomics, metabolomics and tumor information collected from his clinical reports, laboratory tests, Computed tomography (CT) scan and Magnetic Resonance imaging (MRI).

Data about the tumors is not limited to size, organ of origin, tissue of origin (histopathology), immuno-histochemical behavior, grade of tumor, other known variables like lympho-vascular involvement, margins and other known factors as per availability. The system considers all the above data or only such data as may be relevant, on a case-to-case basis.

According to one embodiment, the system considers patient clinical data related parameters that includes but are not limited to age, smoking history, alcohol use, ethnicity, weight, height, volume of organ proportionate to tumor, co-morbidity (for example, diabetes, collagen vascular disease, hypertension, inflammatory bowel disease), genetic makeup, body fat, food habits etc. shall be evaluated According to one embodiment, the system considers patient genomic data related parameters that includes but not limited an array of known and proposed gene variations-irs1 (XRCC2), irs2 (XRCC8), irs3 (RAD51C), irs20 (PRKDC), IRS1-SF (XRCC3), xrs5 (XRCC5) and XR-1 (XRCC4) and all those that offer sensitivity or resistance will be taken into account.

According to one embodiment, the system considers patient metabolomic data related parameters that includes but are not limited to metabolic variables like lipid content/bone density/muscle mass, hypoxic tissue, estimated pH, hydration status, possibility of pre-existing free-radical insult at cellular level shall be considered According to one embodiment, the system considers the anatomical variables like distance of organ traversed in RT field, vessel wall thickness, hydration status of tissue, percent of necrosis, stromal effect, tissues surrounding the tumor, proximity to critical structures.

According to one embodiment, the system considers physics variables like temp of organ vs room, beam features, dose fractions.

According to one embodiment, the system considers the physiological variables like blood flow/local pH/oxygenation.

According to one embodiment, the system takes into account the principles of radiation physics like total radiation dose, dose per fraction, overall treatment time, planned doses to critical normal tissues.

According to one embodiment, the system considers, periodically, the physician and patient reported toxicity parameters.

Figure 2:
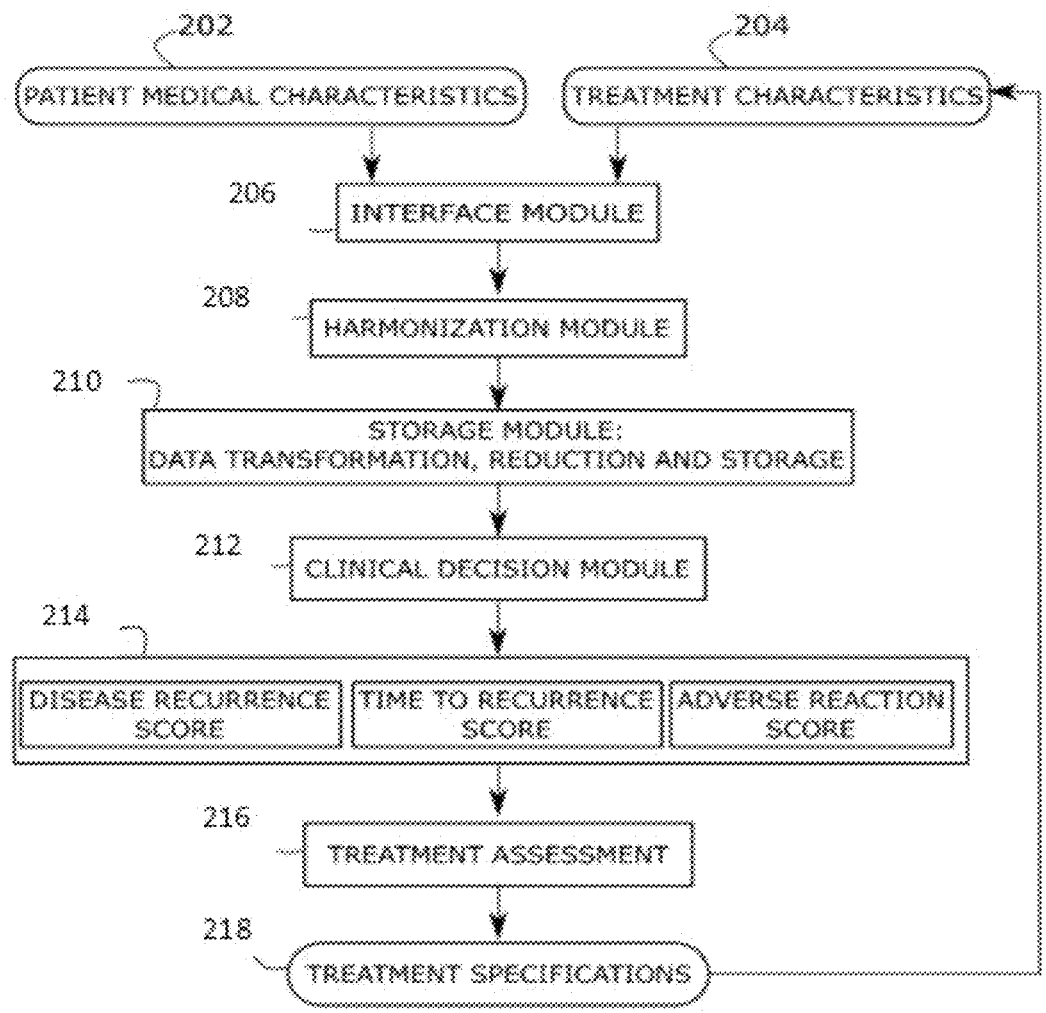
FIG. 2 illustrates the system workflow of data processing and analysis
Figure 3:
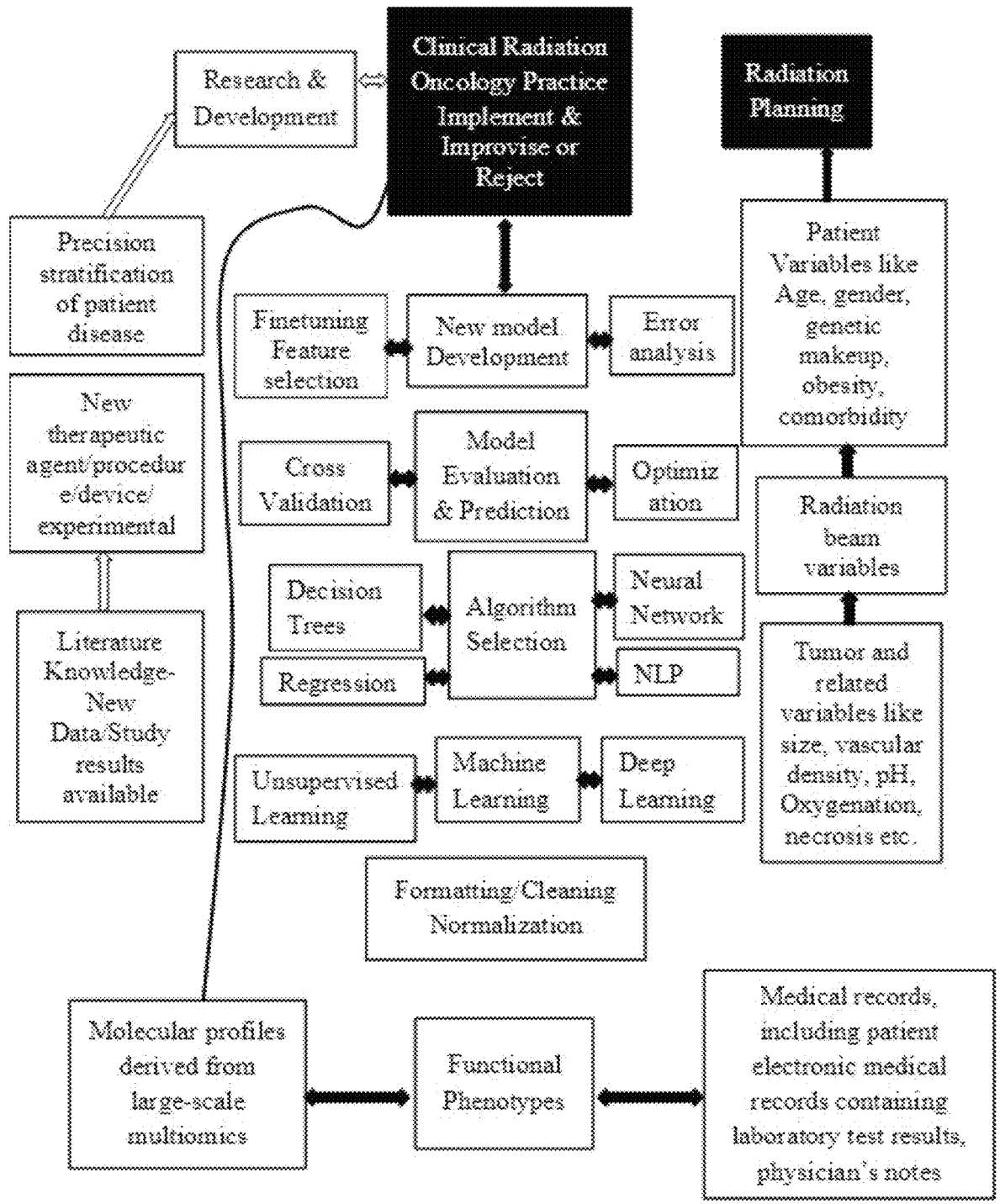
FIG. 3 illustrates the architecture of the solution
Figure 4:
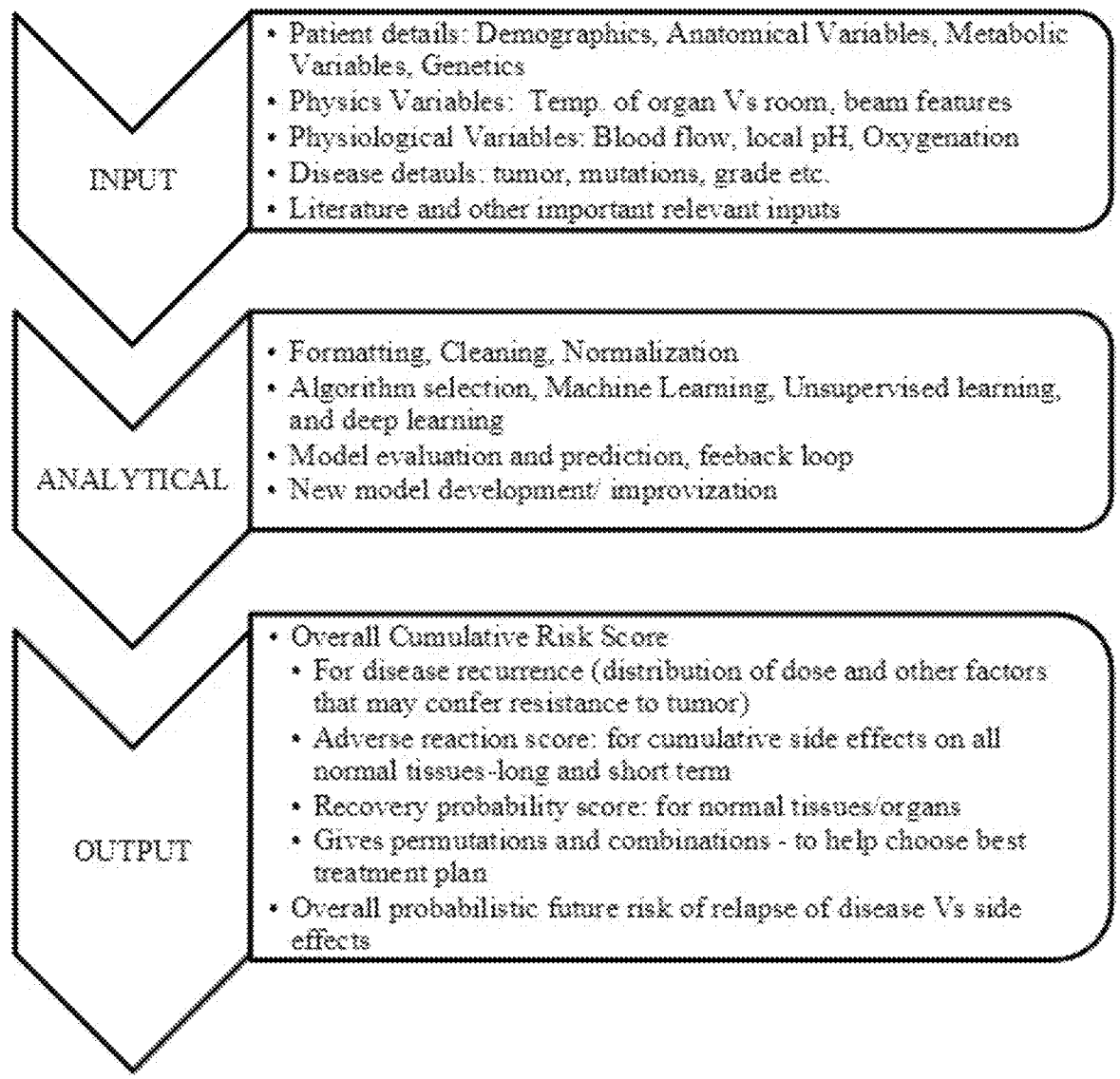
FIG. 4 illustrates the overall process of data analysis comprising the input layer, analytical and output layer.

The entire data, changing from baseline and over a period of time shall be fed into the AI/Machine learning algorithm The system generates the scores for assessment of a treatment using radiation therapy as illustrated in FIG. 1 and FIG. 2 by leveraging a set of software modules. These modules are interface module, harmonization module, storage module, machine learning module, clinical decision module and treatment assessment module.

The interface module 206 (also referred to as input layer 114 of FIG. 1) receives raw data about the patient's characteristics and a suggested radio therapy treatment to that patient from the physicians (shown as 130 of FIG. 1). The data about the patient medical characteristics 202 and treatment characteristics 204 can be collected from devices or manually entered by physicians or caretakers. This raw data from interface module is transmitted to harmonization module 208 (116 of FIG. 1), to combine the raw data captured from multiple sources into uniform, unambiguous, standardized usable record structure for further processing. The data from harmonization module is diffused to storage module 210 (118 of FIG. 1) for storage of standardized patient's data and treatment information into records. These records are to be utilized for training the machine learning models (shown as 124 in FIG. 1) and for performing analytics to gaining insight into the most appropriate treatment for a patient based on their clinical and medical characteristics. The Machine Learning Module 124 consumes data that has been preprocessed (using data preprocessing module shown as 122 in FIG. 1) and utilizes techniques such as deep learning and artificial neural networks including but not limited to Recurrent Neural Networks (RNN), Long Short Term Memory (LSTM), Convolution Neural Networks (CNN), traditional machine learning techniques including but not limited to linear models (logistic regression, linear regression, support vector machines), Classification and Regression Trees (CART), boosting, bagging, random forests and other statistical techniques and rule based algorithms. The Machine Learning Module 124 produces output including— the probability of Progression Free Survival at time point t after Adjuvant Radiotherapy, the probability of Overall Survival at time point t after Adjuvant Radiotherapy, the probability of tumor regression after Neoadjuvant Radiotherapy, probability of Progression Free Survival at time t after Neoadjuvant radiotherapy, probability of symptom improvement after Neoadjuvant radiotherapy, probability of Overall Survival at time point t after Radical radiotherapy, probability of tumor regression after Radical radiotherapy, probability of Progression Free Survival at time t after Radical Radiotherapy, probability of symptom improvement after Radical Radiotherapy, probability of symptom improvement after Palliative Radiotherapy, probability of tumor regression after Palliative Radiotherapy, probability of Progression Free Survival at time t after Palliative Radiotherapy, probability of Overall Survival at time t after Palliative Radiotherapy, probability of tumor recurrence in organs or tissues after radiotherapy, probability of a particular grade of side effect occurring after radiotherapy, probability of resolution of side effect at time t after radiotherapy and probability of resolution of side effects after radiotherapy. Clinical decision module 212 (120 of FIG. 1) provide knowledge represented through machine learning models to aid the physicians suggesting optimal specification of treatment parameters for a patient. These models are trained on the data stored in storage module until they attain power to predict scores related to a specific radiotherapy treatment. When the trained models are presented with a patient's characteristics and treatment specification, they will generate raw scores.

Output layer 214 (126 of FIG. 1), presents the disease recurrence score, time to recurrence score and adverse reaction score for a specific treatment. Theses scores provides a platform for assessment of the treatments by the physicians. Treatment assessment 216 module is used to ratify the radiotherapy dosage parameters. Whether a specific dosage of the give patient characteristics will be appropriate as per the knowledge the model gained form past patient-treatments data. The final output of the whole process is the precise specifications of the parameters of the treatment 218 are presented to physicians for further clinical actions.

The Clinical decision module 212 has a set of models built to acquire insights about the assessment of radio therapy treatment from multiple aspects using scores. In one embodiment, the Clinical decision module has these models:
1. Adjuvant Radiotherapy Progression Free Survival (Time to recurrence) Model
2. Adjuvant Radiotherapy Overall Survival (Time to recurrence) Model
3. Neoadjuvant Radiotherapy RECIST criteria-based Probability of tumor regression Model
4. Neoadjuvant Radiotherapy Progression Free Survival (Time to recurrence) Model:
5. Neoadjuvant Radiotherapy Symptom Improvement Model:
6. Radical Radiotherapy Overall Survival (Time to recurrence) Model
7. Radical Radiotherapy RECIST criteria-based Probability of tumor regression Model:
8. Radical Radiotherapy Progression Free Survival (Time to recurrence) Model:
9. Radical Radiotherapy Symptom Improvement Model
10. Palliative Radiotherapy Symptom Improvement Model
11. Palliative Radiotherapy RECIST criteria-based Probability of tumor regression Model
12. Palliative Radiotherapy Progression Free Survival (Time to recurrence) Model
13. Palliative Radiotherapy Overall Survival (Time to recurrence) Model
14. Radiotherapy Areas of Recurrence Model
15. Radiotherapy Side effects Grade Model
16. Radiotherapy Side effects Time to Resolution
17. Radiotherapy Non-resolving Side Effects Model Each model has an objective/event for the give set of input characteristics and the generated outcome provides an information in terms of probability about the occurrence of the event with respect to time. Each model's objective and its characteristics are discussed below:
1. Adjuvant Radiotherapy Progression Free Survival (Time to Recurrence) Model:
   Progression Free Survival serves as the primary indicator for success of adjuvant radiotherapy.
   A model was built to determine Progression free survival after adjuvant radiotherapy.
   a. Dependent Variables: Including but not limited to the list of characteristics presented in Table 1.

TABLE 1

| List of variables considered for modelling the Adjuvant Radiotherapy Progression Free Survival | | | |
|---|---|---|---|
| Age | Smoking history | Alcohol use | Ethnicity |
| Weight | Height | Volume of organ/tissue e.g breast volume in case of breast cancer | Diabetes |
| Hypertension | Collagen vascular disease | Inflammatory bowel disease | Body fat |

TABLE 1-continued

List of variables considered for modelling the Adjuvant Radiotherapy Progression Free Survival

| | | | |
|---|---|---|---|
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content | Bone density | Muscle mass | hypoxic tissue |
| estimated pH | possibility of pre-existing free-radical insult at cellular level | Temp of organ vs Room | Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Time to progression of disease c. Type of Model: Survival (Time to event) Model d. Output of Model: Probability of Progression free survival at time point t (t is a time point like 1 month after adjuvant radiotherapy).

2. Adjuvant Radiotherapy Overall Survival (Time to recurrence) Model:

Overall Survival serves as the secondary indicator for success of adjuvant radiotherapy.

A model was built to determine Overall survival after adjuvant radiotherapy.

a. Dependent Variables: Including but not limited to the list of characteristics presented in Table 2.

b. Independent Variable: Time to overall survival c. Type of Model: Survival (Time to event) Model d. Output of Model: Probability of overall survival at time point t (t is a time point like 1 month after adjuvant radiotherapy)

3. Neoadjuvant Radiotherapy RECIST Criteria-Based Probability of Tumor Regression Model:

RECIST criteria-based Probability of tumor regression serves as the primary indicator for success of neoadjuvant radiotherapy.

A model was built to determine Probability of tumor regression after neoadjuvant radiotherapy.

TABLE 2

List of variables considered for modelling the Adjuvant Radiotherapy Overall Survival

| | | | |
|---|---|---|---|
| Age | Smoking history | Alcohol use | Ethnicity |
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content | Bone density | Muscle mass | hypoxic tissue |
| estimated pH | possibility of pre-existing free-radical insult at cellular level | Temp of organ vs Room | Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | a. Dependent Variables: Including but not limited to the list of characteristics presented in Table 3.

TABLE 3

List of variables considered for modelling Neoadjuvant Radiotherapy RECIST criteria-based Probability

| | | | |
|---|---|---|---|
| Age | Smoking history | Alcohol use | Ethnicity |
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content | Bone density | Muscle mass | hypoxic tissue |
| estimated pH | possibility of pre-existing free-radical insult at cellular level | Temp of organ vs Room | Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Whether tumor regression occurred?

The mapping from RECIST criteria to whether tumor regression occurred was as follows:

Data points with Complete Response and Partial Response were together considered as tumor regression occurred Data Points with Stable Disease and Progressive Disease were together considered as absence of tumor regression.

c. Type of Model: Binary Classification Model d. Output of Model: Probability of tumor regression post neoadjuvant radiotherapy Neoadjuvant Radiotherapy Progression Free Survival (Time to Recurrence) Model:

Progression Free Survival serves as the secondary indicator for success of neoadjuvant radiotherapy.

A model was built to determine Progression free survival after neoadjuvant radiotherapy.

a. Dependent Variables: Including but not limited to the list of characteristics presented in Table 4.

TABLE 4

List of variables considered for modelling Neoadjuvant Radiotherapy Progression Free Survival

| | | | |
|---|---|---|---|
| Age | Smoking history | Alcohol use | Ethnicity |
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irsl (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content | Bone density | Muscle mass | hypoxic tissue |
| estimated pH | possibility of pre-existing free-radical insult at cellular level | Temp of organ vs Room | Beam features |
| Total radiation dose | dose per fraction | overall treatment time | planned doses to critical normal tissues |

TABLE 4-continued

List of variables considered for modelling Neoadjuvant Radiotherapy Progression Free Survival

| site-specific patient-reported toxicity | Physician-reported toxicity | use of chemotherapy | use of hormone therapy |
|---|---|---|---|
| use of surgery | concurrent medications | | | b. Independent Variable: Time to progression of disease
c. Type of Model: Survival (Time to event) Model
d. Output of Model: Probability of Progression free survival at time point t (t is a time point like 1 month after neoadjuvant radiotherapy)

5. Neoadjuvant Radiotherapy Symptom Improvement Model:

Probability of Symptom Improvement serves as the tertiary indicator for success of neoadjuvant radiotherapy.

A model was built to determine Probability of Symptom Improvement after neoadjuvant radiotherapy.

a. Dependent Variables: Including but not limited to the list of characteristics presented in Table 5.

TABLE 5

List of variables considered for modelling Neoadjuvant Radiotherapy Symptom Improvement

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Dependent Variable: Whether Symptom Improvement occurred?
c. Type of Model: Binary Classification Model
d. Output of Model: Probability of symptom improvement post neoadjuvant radiotherapy 6. Radical Radiotherapy Overall Survival (Time to Recurrence) Model:

Overall Survival serves as the primary indicator for success of Radical radiotherapy. A model was built to determine Overall survival after Radical radiotherapy.

a. Dependent Variables: Including but not limited to the list of characteristics presented in Table 6.

TABLE 6

List of variables for modelling Radical Radiotherapy Overall Survival

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Time to overall survival
c. Type of Model: Survival (Time to event) Model
d. Output of Model: Probability of overall survival at time point t (t is a time point like 1 month after Radical radiotherapy)

7. Radical Radiotherapy RECIST Criteria-Based Probability of Tumor Regression Model:

RECIST criteria-based Probability of tumor regression serves as the secondary indicator for success of Radical radiotherapy.

A model was built to determine Probability of tumor regression after Radical radiotherapy.

a. Dependent Variables: Including but not limited to—

TABLE 7

List of variables considered for modelling Radical Radiotherapy RECIST criteria-based Probability

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Whether tumor regression occurred?

The mapping from RECIST criteria to whether tumor regression occurred was as follows:

Data points with Complete Response and Partial Response were together considered as tumor regression occurred Data Points with Stable Disease and Progressive Disease were together considered as absence of tumor regression.

c. Type of Model: Binary Classification Model d. Output of Model: Probability of tumor regression post Radical radiotherapy 8. Radical Radiotherapy Progression Free Survival (Time to Recurrence) Model:

Progression Free Survival serves as the tertiary indicator for success of Radical radiotherapy.

A model was built to determine Progression free survival after Radical radiotherapy.

a. Dependent Variables: Including but not limited to the list of characteristics that

TABLE 8

List of variables considered for modelling Radical Radiotherapy Progression Free Survival

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Time to progression of disease c. Type of Model: Survival (Time to event) Model d. Output of Model: Probability of Progression free survival at time point t (t is a time point like 1 month after Radical radiotherapy)

9. Radical Radiotherapy Symptom Improvement Model:

Probability of Symptom Improvement serves as the quaternary indicator for success of Radical radiotherapy.

A model was built to determine Probability of Symptom Improvement after Radical radiotherapy.

a. Dependent Variables: Including but not limited to—

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |

-continued

| Age | Smoking history | Alcohol use | Ethnicity |
|---|---|---|---|
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Whether Symptom Improvement occurred?

c. Type of Model: Binary Classification Model d. Output of Model: Probability of symptom improvement post Radical radiotherapy 10. Palliative Radiotherapy Symptom Improvement Model:

Probability of Symptom Improvement serves as the primary indicator for success of palliative radiotherapy.

A model was built to determine Probability of Symptom Improvement after Palliative radiotherapy.

a. Dependent Variables: Including but not limited to list of characteristics presented in Table 10.

TABLE 10

List of variables considered for modelling Palliative Radiotherapy Symptom Improvement

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |

TABLE 10-continued

List of variables considered for modelling Palliative Radiotherapy Symptom Improvement

| Age | Smoking history | Alcohol use | Ethnicity |
|---|---|---|---|
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Whether Symptom Improvement occurred?

c. Type of Model: Binary Classification Model d. Output of Model: Probability of symptom improvement post Palliative radiotherapy 11. Palliative Radiotherapy RECIST Criteria-Based Probability of Tumor Regression Model:

RECIST criteria-based Probability of tumor regression serves as the secondary indicator for success of Palliative radiotherapy.

A model was built to determine Probability of tumor regression after Palliative radiotherapy.

a. Dependent Variables: Including but not limited to the list of characteristics as presented in Table 11.

TABLE 11

List of variables considered for modelling for Palliative Radiotherapy RECIST criteria-based Probability of tumor regression

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |

TABLE 11-continued

List of variables considered for modelling for Palliative Radiotherapy RECIST criteria-based Probability of tumor regression

| Age | Smoking history | Alcohol use | Ethnicity |
|---|---|---|---|
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Whether tumor regression occurred?

The mapping from RECIST criteria to whether tumor regression occurred was as follows:

Data points with Complete Response and Partial Response were together considered as tumor regression occurred Data Points with Stable Disease and Progressive Disease were together considered as absence of tumor regression.

c. Type of Model: Binary Classification Model d. Output of Model: Probability of tumor regression post Palliative radiotherapy 12. Palliative Radiotherapy Progression Free Survival (Time to Recurrence) Model:

Progression Free Survival serves as the tertiary indicator for success of Palliative radiotherapy.

A model was built to determine Progression free survival after Palliative radiotherapy.

a. Dependent Variables: Including but not limited to the list of characteristics presented in Table 12.

TABLE 12

List of variables considered for modelling Palliative Radiotherapy Progression Free Survival

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |

TABLE 12-continued

List of variables considered for modelling Palliative Radiotherapy Progression Free Survival

| Age | Smoking history | Alcohol use | Ethnicity |
|---|---|---|---|
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Time to progression of disease c. Type of Model: Survival (Time to event) Model d. Output of Model: Probability of Progression free survival at time point t (t is a time point like 1 month after Palliative radiotherapy)

13. Palliative Radiotherapy Overall Survival (Time to Recurrence) Model:

Overall Survival serves as the quaternary indicator for success of Palliative radiotherapy.

A model was built to determine Overall survival after Palliative radiotherapy.

a. Dependent Variables: Including but not limited to the list of characteristics presented in Table 13.

TABLE 13

List of variables considered for modelling Palliative Radiotherapy Overall Survival

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |

TABLE 13-continued

List of variables considered for modelling Palliative Radiotherapy Overall Survival

| Age | Smoking history | Alcohol use | Ethnicity |
|---|---|---|---|
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Time to overall survival
c. Type of Model: Survival (Time to event) Model
d. Output of Model: Probability of overall survival at time point t (t is a time point like 1 month after Palliative radiotherapy)

14. Radiotherapy Areas of Recurrence Model: A model was built to predict areas of recurrence following radiotherapy.
   a. Dependent Variables: Including but not limited to the list of characteristics presented in Table 14.

TABLE 14

List of the variables considered for modelling as Radiotherapy Areas of Recurrence

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Organ/tissues where tumor recurrence occurred
c. Type of Model: Multi-label Classification Model
d. Output of Model: Probability of tumor recurrence in each organ/tissue post radiotherapy 15. Radiotherapy Side Effects Grade Model:
   A model was built to predict grade of each side effect following radiotherapy.
   a. Dependent Variables: Including but not limited to the list of characteristics presented in Table 15.

TABLE 15

List of variables considered for modelling Radiotherapy Side effects Grade

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity use of surgery | Physician-reported toxicity concurrent medications | use of chemotherapy | use of hormone therapy | b. Independent Variable: Grade of Side effect
c. Type of Model: Multioutput-Multi-class Classification Model
d. Output of Model: Probability of a particular grade of side effect occurring post radiotherapy 16. Radiotherapy Side Effects Time to Resolution:
   A model was built to determine time to resolution of a particular side effect post radiotherapy.
   This model upon training was used to predict time to resolution for those side effects that were predicted to occur by the 'Radiotherapy Side effects Model.'
   a. Dependent Variables: Including but not limited to the list of characteristics presented in Table 16.

TABLE 16

List of variables considered for modelling Radiotherapy Side effects Time to Resolution

| Age | Smoking history | Alcohol use | Ethnicity |
|---|---|---|---|
| Weight | Height | Volume of organ/tissue e.g. breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Time to resolution of side effect c. Type of Model: Survival (Time to event) Model d. Output of Model: Probability of resolution of side effect at time point t (t is a time point like 1 month after radiotherapy)

17. Radiotherapy Non-Resolving Side Effects Model:

A model was built to predict side effects that will not resolve following radiotherapy.

a. Dependent Variables: Including but not limited to the list of characteristics presented in Table 17.

TABLE 17

List of variables considered for modelling Radiotherapy Non-resolving Side Effects

| Age | Smoking history | Alcohol use | Ethnicity |
|---|---|---|---|
| Weight | Height | Volume of organ/tissue e.g. breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | | b. Independent Variable: Resolution of Side effect c. Type of Model: Multilabel Classification Model d. Output of Model: Probability of resolution of side effects occurring post radiotherapy

EXAMPLES

A] Exemplary System of Determining Tumor Regression, Survival Time and Symptom Improvement Following Radiotherapy The system receives as input in various embodiments of the claimed invention data including but not limited to the demographic, clinical, social, genomic, omics data and treatment data about the patient as presented in Table 18.

TABLE 18

List of variables considered for determining tumor regression, survival time and symptom improvement following radiotherapy

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |

TABLE 18-continued

List of variables considered for determining tumor regression, survival time and symptom improvement following radiotherapy

| Age | Smoking history | Alcohol use | Ethnicity |
|---|---|---|---|
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | |

Example 1: Survival Prediction Following Radiotherapy 1—Adjuvant Radiotherapy The system consumes the input data and use advanced machine learning and statistical techniques to output a survival score (a value between 0 and 1) which represents the survival likelihood at time t (for example 1 month) following adjuvant radiotherapy.

Using the score, clinicians can intervene and alter the modifiable treatment, patient and clinical characteristics so as to obtain longest survival time (as per progression free survival and overall survival times).

Example 2: Survival Prediction Following Radiotherapy 2—Neoadjuvant Radiotherapy The system consumes the input data and use advanced machine learning and statistical techniques to output a survival score (a value between 0 and 1) which represents the survival likelihood, tumor regression likelihood and symptom improvement likelihood at time t (for example 1 month) following neoadjuvant radiotherapy.

Using the score, clinicians can intervene and alter the modifiable treatment, patient and clinical characteristics so as to obtain maximum tumor regression (as per RECIST criteria), longest survival time (as per progression free survival time) and maximum symptom improvement.

Example 3: Survival Prediction Following Radiotherapy 3—Radical Radiotherapy The system consumes the input data and use advanced machine learning and statistical techniques to output a survival score (a value between 0 and 1) which represents the survival likelihood, tumor regression likelihood and symptom improvement likelihood at time t (for example 1 month) following radical radiotherapy.

Using the score, clinicians can intervene and alter the modifiable treatment, patient and clinical characteristics so as to obtain maximum tumor regression (as per RECIST criteria), longest survival time (as per progression free survival and overall survival times) and maximum symptom improvement.

Example 4: Survival Prediction Following Radiotherapy 4—Palliative Radiotherapy The system consumes the input data and use advanced machine learning and statistical techniques to output a survival score (a value between 0 and 1) which represents the survival likelihood, tumor regression likelihood and symptom improvement likelihood at time t (for example 1 month) following palliative radiotherapy.

Using the score, clinicians can intervene and alter the modifiable treatment, patient and clinical characteristics so as to obtain maximum tumor regression (as per RECIST criteria), longest survival time (as per progression free survival and overall survival times) and maximum symptom improvement.

B] Exemplary System of Determining Side Effects Following Radiotherapy

The system receives as input in various embodiments of the claimed invention data including but not limited to the demographic, clinical, social, genomic, omics data and treatment data about the patient as presented as Table 19.

TABLE 19

List of variables considered for determining side effects following radiotherapy

| Age | Smoking history | Alcohol use | Ethnicity |
|---|---|---|---|
| Weight | Height | Volume of organ/tissue e.g breast volume in case of breast cancer | Diabetes |
| Hypertension | Collagen vascular disease | Inflammatory bowel disease | Body fat |
| Nutrition | Tumor type | Tumor stage (TNM) | Tumor grade |
| Tumor pathology | Tumor volume | Tumor vascular density | Tumor oxygenation (estimated by imaging) |
| Tumor hydration status | Tumor marker (ER) | Tumor marker (PR) | Tumor marker (HER 2) |
| Tumor marker (other) | Ki-67 index | Genetic variations irs1 (XRCC2) | Genetic variation irs2 (XRCC8) |
| irs3 (RAD51C) | irs20 (PRKDC) | IRS1-SF (XRCC3) | xrs5 (XRCC5) |
| XR-1 (XRCC4) | Distance of organ traversed in RT field | Vessel wall thickness | hydration status of tissue |
| Percent of necrosis | stromal effect | tissues surrounding the tumor | proximity to critical structures |
| Lipid content estimated pH | Bone density possibility of pre-existing free-radical insult at cellular level | Muscle mass Temp of organ vs Room | hypoxic tissue Beam features |
| Total radiation dose | dose per fraction | overall treatment time | planned doses to critical normal tissues |
| site-specific patient-reported toxicity | Physician-reported toxicity | use of chemotherapy | use of hormone therapy |
| use of surgery | concurrent medications | | |

Example 5: Adverse Event Prediction Following Radiotherapy

The system consumes the input data and use advanced machine learning and statistical techniques to output an adverse event score (a value between 0 and 1) which represents the adverse events predicted, grade of adverse events predicted, the number of adverse events predicted, the time to resolution of adverse events (for example 1 month) following radiotherapy and non-resolving adverse events.

Using the score, clinicians can intervene and alter the modifiable treatment, patient and clinical characteristics so as to obtain minimum adverse events in terms of number, grade, fastest time to resolution and minimum non-resolving adverse events.

Algorithms:
Survival Scores:
1. Adjuvant Radiotherapy Survival Score:
Survival Score
  Raw Survival Score: Probability of survival at time t
  Survival Score=normalize raw survival score to range 0.00 to 1.00.

Example

If Probability of survival at 2 year=0.800
Raw Survival score at time 2 years=0.800
If Highest raw score in training data of probability of survival at time 2 years=0.90
If Lowest raw score in training data of probability of survival at time 2 years=0.15
Survival Score at 2 years=(0.80-0.15)/(0.90-0.15)=0.65/0.75=0.87

Determine Survival Scores for Progression free survival Score (PFS) (primary indicator for success of Adjuvant radiotherapy) and Overall Survival Score (OS) (secondary indicator for success of Adjuvant radiotherapy).

The output of the Radiotherapy Areas of Recurrence Model is the probability of recurrence of the tumor in different organs.

If none of the areas/organs have a probability of recurrence >0.50 then Survival Score (Rec)=0.10
If 1 area/organ have a probability of recurrence >0.50 then Survival Score (Rec)=0.05
If 2 or more areas/organs have a probability of recurrence >0.50 then Survival Score (Rec)=0.0
Survival Score (Adjuvant radiotherapy)=(0.60) (Survival Score (PFS)+(0.30) (Survival Score (OS)+Survival Score (Rec)
Survival Score Interpretation: The higher the patient's survival score, the better the prognosis.

2. Neoadjuvant Radiotherapy Survival Score:
Survival Score
  The output of Neoadjuvant Radiotherapy RECIST criteria-based Probability of tumor regression Model is the probability of tumor regression post neoadjuvant radiotherapy. Survival Score (RECIST)=normalize raw survival score to range between 0.00 to 1.00

Example

If Survival probability (RECIST)=0.800
Raw Survival score (RECIST)=0.800
If Highest raw score in training data of probability of tumor regression=0.90
If Lowest raw score in training data of probability of tumor regression=0.15
Survival Score (RECIST)=(0.80-0.15)/(0.90-0.15)=0.65/0.75=0.87
Raw Survival Score (Progression free survival): Probability of survival at time t
Survival Score=normalize raw survival score to range 0.00 to 1.00.

Example

If Probability of survival at 2 year=0.800
Raw Survival score at time 2 years=0.800
If Highest raw score in training data of probability of survival at time 2 years=0.90
If Lowest raw score in training data of probability of survival at time 2 years=0.15
Survival Score at 2 years=(0.80-0.15)/(0.90-0.15)=0.65/0.75=0.87

Determine Survival Scores for Progression free survival Score (PFS) (secondary indicator for success of Neoadjuvant radiotherapy)

The output of Neoadjuvant Radiotherapy Symptom Improvement Model is the probability of symptom improvement post neoadjuvant radiotherapy.
Survival Score (SI)=normalize raw survival score to range between 0.00 to 1.00

Example

If Survival probability (SI)=0.800
Raw Survival score (SI)=0.800
If Highest raw score in training data of probability of symptom improvement=0.90
If Lowest raw score in training data of probability of symptom improvement=0.15
Survival Score (SI)=(0.80-0.15)/(0.90-0.15)=0.65/0.75=0.87

The output of the Radiotherapy Areas of Recurrence Model is the probability of recurrence of the tumor in different organs.

If none of the areas/organs have a probability of recurrence >0.50 then Survival Score (Rec)=0.10
If 1 area/organ have a probability of recurrence >0.50 then Survival Score (Rec)=0.05
If 2 or more areas/organs have a probability of recurrence >0.50 then Survival Score (Rec)=0.0
Survival Score (Neoadjuvant radiotherapy)=(0.50) (Survival Score (RECIST))+(0.25)
(Survival Score (PFS)+(0.15) (Survival Score (SI)+Survival Score (Rec)
Survival Score Interpretation: The higher the patient's survival score, the better the prognosis.

3. Radical radiotherapy Survival Score:
Survival Score
  Raw Survival Score: Probability of survival at time t
  Survival Score=normalize raw survival score to range 0.00 to 1.00.

Example

If Probability of survival at 2 year=0.800
Raw Survival score at time 2 years=0.800
If Highest raw score in training data of probability of survival at time 2 years=0.90
If Lowest raw score in training data of probability of survival at time 2 years=0.15

Survival Score at 2 years=(0.80−0.15)/(0.90−0.15)=0.65/0.75=0.87

Determine Survival Scores for Progression free Survival Score (PFS) and Overall Survival Score (OS).

The output of Radical Radiotherapy RECIST criteria-based Probability of tumor regression Model is the probability of tumor regression post radical radiotherapy.

Survival Score (RECIST)=normalize raw survival score to range between 0.00 to 1.00

Example

If Survival probability (RECIST)=0.800
Raw Survival score (RECIST)=0.800
If Highest raw score in training data of probability of tumor regression=0.90
If Lowest raw score in training data of probability of tumor regression=0.15
Survival Score (RECIST)=(0.80−0.15)/(0.90−0.15)=0.65/0.75=0.87

The output of Radical Radiotherapy Symptom Improvement Model is the probability of symptom improvement post neoadjuvant radiotherapy.

Survival Score (SI)=normalize raw survival score to range between 0.00 to 1.00

Example

If Survival probability (SI)=0.800
Raw Survival score (SI)=0.800
If Highest raw score in training data of probability of symptom improvement=0.90
If Lowest raw score in training data of probability of symptom improvement=0.15
Survival Score (SI)=(0.80−0.15)/(0.90−0.15)=0.65/0.75=0.87

The output of the Radiotherapy Areas of Recurrence Model is the probability of recurrence of the tumor in different organs.
  If none of the areas/organs have a probability of recurrence >0.50 then Survival Score (Rec)=0.10
  If 1 area/organ have a probability of recurrence >0.50 then Survival Score (Rec)=0.05
  If 2 or more areas/organs have a probability of recurrence >0.50 then Survival Score (Rec)=0.0
  Survival Score (Radical radiotherapy)=(0.50) (Survival Score (OS)+(0.20) Survival Score (RECIST)+(0.125) (Survival Score (PFS))+(0.075) (Survival Score (SI)+ Survival Score (Rec)
  Survival Score Interpretation: The higher the patient's survival score, the better the prognosis.

4. Palliative Radiotherapy Survival Score:

The output of Palliative Radiotherapy Symptom Improvement Model is the probability of symptom improvement post Palliative radiotherapy.

Survival Score (SI)=normalize raw survival score to range between 0.00 to 1.00

Example

If Survival probability (SI)=0.800
Raw Survival score (SI)=0.800
If Highest raw score in training data of probability of symptom improvement=0.90
If Lowest raw score in training data of probability of symptom improvement=0.15
Survival Score (SI)=(0.80−0.15)/(0.90−0.15)=0.65/0.75=0.87

The output of Palliative Radiotherapy RECIST criteria-based Probability of tumor regression Model is the probability of tumor regression post palliative radiotherapy.

Survival Score (RECIST)=normalize raw survival score to range between 0.00 to 1.00

Example

If Survival probability (RECIST)=0.800
Raw Survival score (RECIST)=0.800
If Highest raw score in training data of probability of tumor regression=0.90
If Lowest raw score in training data of probability of tumor regression=0.15
Survival Score (RECIST)=(0.80−0.15)/(0.90−0.15)=0.65/0.75=0.87

Survival Score
Raw Survival Score: Probability of survival at time t
Survival Score=normalize raw survival score to range 0.00 to 1.00.

Example

If Probability of survival at 2 year=0.800
Raw Survival score at time 2 years=0.800
If Highest raw score in training data of probability of survival at time 2 years=0.90
If Lowest raw score in training data of probability of survival at time 2 years=0.15
Survival Score at 2 years=(0.80−0.15)/(0.90−0.15)=0.65/0.75=0.87

Determine Survival Scores for Progression free survival Score (PFS) and Overall Survival Score (OS).

The output of the Radiotherapy Areas of Recurrence Model is the probability of recurrence of the tumor in different organs.
If none of the areas/organs have a probability of recurrence >0.50 then Survival Score (Rec)=0.10
If 1 area/organ have a probability of recurrence >0.50 then Survival Score (Rec)=0.05
If 2 or more areas/organs have a probability of recurrence >0.50 then Survival Score (Rec)=0.0
Survival Score (Palliative Radiotherapy)=(0.50) (Survival Score (SI)+(0.20) (Survival Score (RECIST)+(0.125) (Survival Score (PFS))+(0.075) (Survival Score (OS))+Survival Score (Rec)
Survival Score Interpretation: The higher the patient's survival score, the better the prognosis.

Adverse Event Score:

The output of the Radiotherapy side effects grade model is the probability of different side effects and the grade of each
  If highest AE grade is Grade 5 (death)→then AE Score=1.0
  If highest AE grade is Grade 4 (Life threatening)→then AE score=0.8
  Else Algorithm to calculate AE score is as follows:
  Take grades of 5 predicted adverse events with highest grade
Multiply probability of each adverse event with 0.15 if it is grade 3, 0.1 if grade 2 and 0.05 if grade 1.
AE (Grade)=Sum of 5 products described above

Example

Nausea Grade 3 with probability 0.8=0.15×0.8=0.12
Constipation Grade 2 with probability 0.5=0.1×0.5=0.05
Cough Grade 1 with probability 0.9=0.05×0.9=0.045
No other side effects
AE (Grade)=0.12+0.05+0.045+0+0=0.215
The output of Radiotherapy Side effects time to resolution model is the probability of a side effect resolving at time t
Raw Score: Probability of AE resolution at time t
AE resolution Score=normalize raw score to range 0.00 to 1.00.

Example

If Probability of AE resolution at 1 month=0.800
Raw AE resolution score at time 1 month=0.800
If Highest raw score in training data of probability of AE resolution at time 1 month=0.90
If Lowest raw score in training data of probability of AE resolution at time 1 month=0.15
Raw AE resolution Score at 1 month=(0.80−0.15)/(0.90−0.15)=0.65/0.75=0.87
AE (Res)=1−(the average of 5 highest AE resolution scores at 1 month)

The output of the Radiotherapy non-resolving side effects model is probability of resolution of side effects post radiotherapy.
If all of the AE have a probability of resolution >0.50 then AE (Non-Resolution)=0.00
If 1 SE has a probability of resolution <0.50 then AE (Non-Resolution)=0.05
If 2 or more SE have a probability of resolution <0.50 then AE (Non-Resolution)=0.10
AE Score=AE (grade)+(0.15) AE (Res)+AE (Non-Resolution)
AE Score Interpretation: The Lower the AE Score, the Better the Quality of Life (QoL) of the Patient Once the data is entered into the system, then the process of score generation shall initiate. The basic steps involved include the following All the details shall be entered into the respective fields. The values are then classified and given a unique value based on the relative importance of the same. Weighted averages from literature/past experience from center and feedback loop from clinician/radiation oncologist were considered as next level of inputs, which shall be going through the ANN (artificial Neural network system).

While considering all the above parameters as mentioned in the embodiment, the following assumptions are made:
a. Artificial neural network (ANN) using the clinical data including patient visit data, admission data, adverse event data, emergency department visit data, family history, medical history, survival data, treatment data and treatment response data and genomic data including gene expression and gene mutation data, radiation planning details, beam strength, contour and other shall go as inputs. The trained ANN model will predict the response rates/relapse probability and survival probability at time t for the patient.
 a. Survival Score
 b. Raw Survival Score: Probability of survival at time t
 c. Survival Score=normalize raw survival score to range 0.00 to 1.00.
 d. Similarly, the probability of response is assessed in terms of
  i) Magnitude of response (regression from baseline)
  ii) Time for maximum response
  iii) Score at various permutations (ex—if we increase dose—then what shall be response, if we increase oxygen concentration, if we give more fractions etc.)
  iv) Durability of response
  v) Probability of response failure
  vi) And other desired variables
 Similarly, the probability of response is assessed in terms of
  i) Probability of normal organ damage
  ii) Time for maximum toxicity/highest grade (AE)
  iii) Intensity of maximum toxicity (grade of AE)
  iv) Duration of toxicity
  v) Time for resolution
  vi) Probability of residual/long term toxicity
  vii) Score at various permutations (ex—if we reduce dose—then to what extent we can reduce the toxicity etc., what duration of break shall benefit the recovery of organ)

The System gives a customized survival prediction and AE prediction score to each patient taking into account lot of the clinical and genomic data of the patients including treatment data.

We claim:
1. A system comprising:
 a processor storing instructions in non-transitory memory that, when executed, cause the processor to:
 receive raw data from multiple sources for a patient undergoing a treatment comprising radiation therapy, wherein the multiple sources comprise one or more of electronic medical records, imaging data, genomics data, metabolomics data, anatomical data, physiological data, and data from treatment planning systems;
 convert and combine the raw data into standardized usable record structure comprising input parameters for further processing, wherein the input parameters comprise one or more of tumor specific variables of a tumor, patient specific parameters, gene specific parameters, physics variables, metabolic variables, radiation variables, and treatment planning specific parameters of the patient during therapy and post therapy;
 store standardized data into records;
 perform analytics to gain sights using one or more machine learning models trained by utilizing plurality of patient records;
 provide knowledge represented through the machine learning models to aid a physician suggesting specification of treatment parameters for the patient, wherein the treatment parameters comprise one or more of total radiation dose, dose per fraction, overall treatment time, fractionation, beam type, beam energy, physical arrangements, and planned doses to critical normal tissue, wherein the machine learning models comprise deep learning and artificial neural networks;
 present an overall cumulative risk score predicting a treatment response and side effects of the radiation therapy, wherein the overall cumulative risk score comprises compromising one or more of a disease recurrence score, a time to recurrence score, a recovery probability score, and an adverse reaction score for the treatment based on the input parameters, wherein the overall cumulative risk score is a personalized score summarizing survival, adverse events, and the treatment response of the patient;

provide a probabilistic predicting system adapted to be interactive to explore an impact of adjusting the treatment parameters on the overall cumulative risk score configured to adjust the treatment parameters;

obtain new treatment parameters via the probabilistic predicting system by the physician based on a real-time condition of the patient to optimize the treatment response, wherein the treatment response comprises a radiation dose to the tumor versus dose to normal tissue for tumor regression with the side effects being minimal to normal tissues;

update the overall cumulative risk score by incorporating the new treatment parameters and the treatment response through a feedback system;

specify the new treatment radiotherapy dosage parameters in a treatment plan for the patient;

wherein the new treatment parameters are determined based on characteristics of the patient as per the knowledge gained by the machine learning models from past treatments data of the patient and wherein the new treatment parameters are obtained by one or more of increasing the total radiation dose, decreasing the total radiation dose, adjusting the fractionation, adjusting the dose per fraction, altering the overall treatment time, altering the beam type, adjusting the beam energy adjusting the physical arrangements, adjusting dose to the normal tissues, and incorporating additional therapies to managing the side effects and improve treatment outcomes; and wherein the system generates real-time, dynamic, comprehensive therapy outcome prediction score for the radiation therapy via the overall cumulative risk score for the patient.

2. The system as claimed in claim 1, wherein the overall cumulative risk score is obtained using one or more of i) adjuvant radiotherapy progression free survival model configured for calculating a risk probability for survival, ii) adjuvant radiotherapy overall survival model configured for determining a success of adjuvant radiotherapy, iii) neoadjuvant radiotherapy RECIST criteria-based probability of tumor regression model configured for determining a first indicator for success of neoadjuvant radiotherapy, iv) neoadjuvant radiotherapy progression free survival model configured for determining a second indicator for success of neoadjuvant radiotherapy, v) neoadjuvant radiotherapy symptom improvement model configured for determining a third indicator for success of neoadjuvant radiotherapy, vi) radical radiotherapy overall survival model configured for determining a first indicator for success of radical radiotherapy, vii) radical radiotherapy RECIST criteria-based probability of tumor regression model configured for determining a second indicator for success of radical radiotherapy, viii) radical radiotherapy progression free survival model configured for determining a third indicator for success of radical radiotherapy, ix) radical radiotherapy symptom improvement model configured for determining a fourth indicator for success of radical radiotherapy, x) palliative radiotherapy symptom improvement model configured for determining a first indicator for success of palliative radiotherapy, xi) palliative radiotherapy RECIST criteria-based probability of tumor regression model configured for determining a second indicator for success of palliative radiotherapy, xii) palliative radiotherapy progression free survival model configured for determining a third indicator for success of palliative radiotherapy, xiii) palliative radiotherapy overall survival model configured for determining a fourth indicator for success of palliative radiotherapy, xiv) radiotherapy areas of recurrence model configured for determining an area of recurrence following radiotherapy, xv) radiotherapy side effects grade model configured to predict a grade of the side effects following radiotherapy, xvi) radiotherapy side effects time to resolution model configured to determine a time to resolution of the side effects post radiotherapy, and xvii) radiotherapy non-resolving side effects model configured to predict the side effects that will not resolve post radiotherapy.

3. The system as claimed in claim 1, wherein the system is configured to learn from the feedback system, wherein a feedback comprises tumor response and toxicity; and wherein the feedback is utilized to re-calibrate the overall cumulative risk score and suggest timely medical intervention based on the overall cumulative risk score.

4. The system as claimed in claim 1, wherein the feedback system is used to further re-calibrates the overall cumulative risk score for the treatment response and toxicity, based on one or more of tumor regression, oxygen concentration, and the side effects and update a radiation plan.

5. The system as claimed in claim 1, wherein the machine learning models capture an interplay of the input parameters that potentially influence the treatment response by virtue of cellular, tissue, and organ level makeup of the tumor and interaction of the tumor with the normal tissues.

6. The system as claimed in claim 1, wherein the input parameters further comprises demographic variables and social variables.

7. The system as claimed in claim 1, wherein the system is configured to provide predict of a response of the tumor to the radiation therapy and toxicity to the normal tissues.

8. The system as claimed in claim 1, wherein a change in one of the input parameters or the change in one of the input parameters in combination with other input parameters is used to understand an interplay of the input parameters.

9. The system of claim 1, wherein the patient specific parameters comprise one or more of age, smoking history, alcohol use, ethnicity, weight, height, volume of organ proportionate to tumor, genetic makeup, body fat, food habits, co-morbidity data comprising one or more of diabetes, collagen vascular disease, hypertension, inflammatory diseases.

10. The system of claim 1, wherein the tumor specific variables comprise one or more of type of tumor, stage of tumor, node, metastases (TNM), pathology, volume, vascular density, oxygenation, hydration status, genetic makeup comprising one or more of ER, PR, P53, HER 2, grade of the tumor, and Ki-67 index.

11. The system of claim 1, wherein the gene specific parameters comprise gene variations of one or more of irs1 (XRCC2), irs2 (XRCC8), irs3 (RAD51C), irs20 (PRKDC), IRS1-SF (XRCC3), xrs5 (XRCC5) and XR-1 (XRCC4).

12. The system of claim 1, wherein the physics variables comprise one or more of total radiation dose, dose per fraction, fractionation, overall treatment time, planned doses to the normal tissues, temperature of organ, temperature of a therapy room, and beam features.

13. The system of claim 1, wherein the metabolic variables comprise one or more of lipid content, bone density, muscle mass, hypoxic tissue, estimated pH, hydration status, possibility of pre-existing free-radical insult at cellular level.

14. The system of claim 6, wherein the radiation variables comprise one or more of a beam strength and a beam contour.

15. The system of claim 1, wherein the machine learning model further comprise one or more of Recurrent Neural Networks (RNN), Long Short Term Memory (LSTM), Convolution Neural Networks (CNN).

16. The system of claim 1, wherein the machine learning models comprise one or more of logistic regression model, linear regression model, support vector machines model, Classification and Regression Trees (CART) model, boosting model, bagging model, and random forests model.

17. The system of claim 1, wherein the system is further configured to determine an output comprising a probability of overall survival at a future time point due to the treatment.

* * * * *